UNITED STATES PATENT OFFICE.

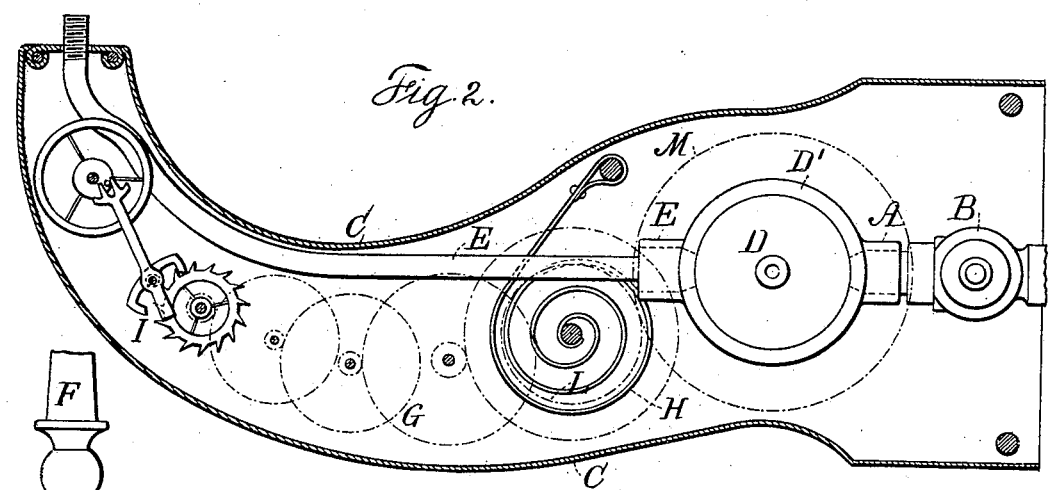
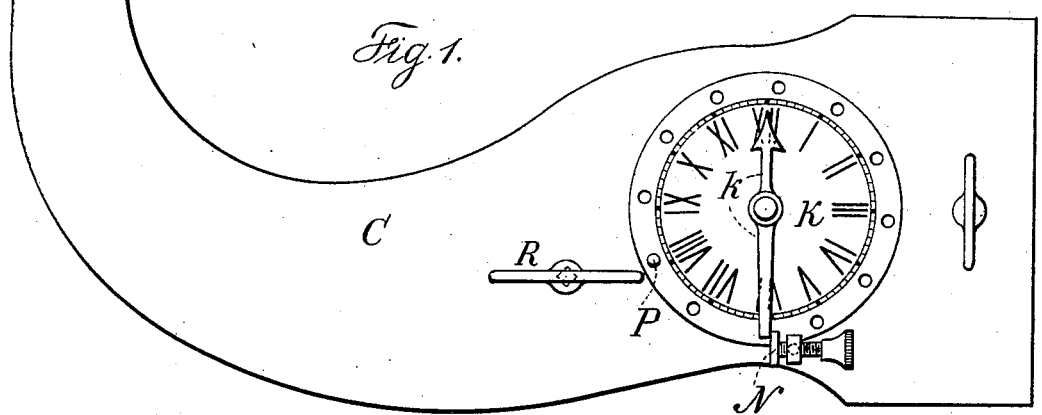
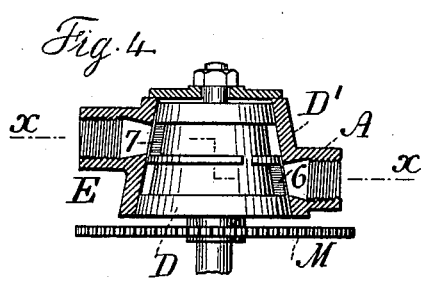
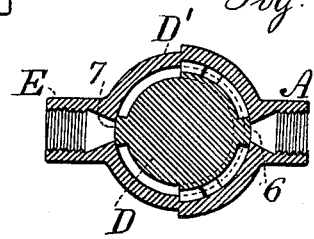

JOHN B. RICHARDS, OF NEW YORK, N. Y.

SELF-CLOSING COCK OR VALVE FOR GAS, &c.

SPECIFICATION forming part of Letters Patent No. 595,921, dated December 21, 1897.

Application filed April 6, 1897. Serial No. 630,981. (No model.)

*To all whom it may concern:*

Be it known that I, JOHN B. RICHARDS, a citizen of the United States, residing in the city, county, and State of New York, have invented an Improvement in Self-Closing Cocks or Valves for Gas or other Fluids, of which the following is a specification.

Gas-cocks have heretofore been provided with a time-movement or clockwork adapted to release a detent or similar device at a designated time, so as to turn off the gas and extinguish the light, but the plug of the cock or valve remains quiescent from the time it is turned on until it is suddenly turned off.

My invention is specially adapted to the extinguishing of gas-lights automatically and after the lapse of a given period of time, and with this object in view the plug of the supply-cock is moved in proportion to the period of time required in the closing of the same, so that the closing mechanism will move the plug progressively back to the closing-point.

It is advantageous to employ a plug that will close both the inlet-pipe and the outlet-pipe. Hence where the inlet and outlet pipes are at opposite sides of the plug and in line with each other less than a half-revolution of the plug can be given in opening such plug, and where the plug is directly connected with a hand over a dial and clock mechanism is employed to rotate such hand the period during which the gas may be allowed to burn is limited to less than six hours.

In the present invention the inlet-pipe at one side of the plug is not in line with the outlet-pipe at the other side of the plug. Hence the plug can receive nearly a complete revolution and be allowed to remain open for a period of nearly twelve hours under the circumstances before mentioned, because the "land" or closing surface of the plug only requires to be sufficiently large to cover the inlet-opening, and a channel extends all around the plug except at this land or closing surface, and a similar land or closing surface is provided at the other side of the plug and a peripheral channel adjacent to or connecting with the first peripheral channel, so that the gas or fluid can pass through the channels of the plug except when the lands or closing surfaces are directly at the ends of the respective inlet and outlet pipes.

In the drawings, Figure 1 is an exterior elevation showing a dial, hand, stops, and winding-key. Fig. 2 is a diagrammatic illustration of the gearing with the case in section and the gas pipes and cocks in elevation. Fig. 3 is a cross-section of the gas-cock at the line $x$ $x$, Fig. 4. Fig. 4 shows the barrel in section and the exterior of the plug, and Fig. 5 shows the movable stop-pin.

The gas or other fluid is to be supplied through a pipe A, and the shut-off or stop-cock is advantageously provided at B, and D represents the plug, and D' the barrel, of a cock or valve, the peculiarities of which will be hereinafter more fully described.

The pipe E extends to a burner P of any ordinary character. Within the case C is a train of gearing G, extending from the spring H to a suitable escapement I. These parts are of usual construction and form a clock or time movement, and there is a dial K on the exterior of the case and a hand $k$ that is moved around and indicates hours or parts of hours, and it is generally advantageous to provide suitable plates within the case for supporting the arbors of the time-movement, and the hour-hand $k$ is upon the arbor of the plug D, so that it moves with such plug, and the gear-wheel L is fastened to the arbor of the spring and it engages the wheel M upon the arbor of the plug D.

In the common clock-movement the arbor of the spring usually revolves once in six hours. I therefore make the wheel L on the arbor of the spring half the size of the wheel M on the arbor of the plug, so that twelve hours, or nearly so, may be consumed in giving to the plug of the cock a complete revolution. By varying the proportion of the wheels L and M any desired time may be consumed in giving to the plug D a complete rotation.

The figures on the dial K are to indicate hours, so that when the pointer of the arm $k$ is turned to indicate "2" the gas will burn for two hours, and so on, and as the spring is wound up the hand will be turned around on the dial to a proportionate extent, and as the clockwork runs down the hand will be turned back to "12" or the point of beginning.

The supply-pipe A usually passes into the barrel D' at the opposite side to the pipe E, leading to the burner; but instead of being in line with each other the pipe A is nearer one end of the barrel than the pipe E, so that the plug D may have two peripheral grooves adjacent to each other, the ends of the grooves terminating on opposite sides of the plug where the lands or surfaces of the plug close the respective pipes, and there are openings, passage-ways, or channels connecting one groove with the other, so that when the plug is turned around to its normal position the lands 6 and 7 close the ends of the respective pipes A and E, and as soon as the plug is turned the channels for the gas are opened, the gas passing to the burner until the spring has turned the plug back to its normal position, and the time occupied in so doing is regulated by the clockwork and indicated by the dial.

It is to be understood that in the normal position the spring is to be wound up sufficiently to obtain the necessary power for freely turning the plug of the cock, and I provide a stop for arresting the movement of the parts when the gas is shut off. This stop is shown at N, there being an arm extending out from the arbor of the plug at the opposite side to the pointer or hand, which arm comes in contact with such stop N, and it is advantageous to employ a set-screw acting against the arm, so that by adjusting this screw the plug can be brought into the proper position for entirely shutting off the flow of gas, or it may be so adjusted that a small flame may remain burning, the gas being either extinguished or turned down to a very small flame when the arm is arrested by the stop N.

To prevent the plug being turned back too far and to limit the period of time during which the gas may be allowed to burn, I provide a back-stop pin P to be inserted into any one of a series of holes around the dial, and this pin prevents the arm $k$ being turned after reaching such pin, and hence the pointer upon the arm will indicate the number of hours during which the gas will be allowed to burn. This is important in hotels where the attendant can set the stop-pin for the time that the gas is needed—say one hour or more—and should the guest on seeing the light gradually diminish turn on the gas again it can only be used for the period of time indicated and then it is shut off automatically, and if blown out there is but little risk to the occupant in the room, as the gas will only escape for a short time.

I claim as my invention—

1. The combination with the cock or valve for admitting gas or other fluid, of a spring and clock-movement directly connected to the plug of the cock so that the spring is wound simultaneously with the opening of the cock and the plug is turned gradually by the spring as the clockwork runs down, and a dial and hand connected to and moving in both directions with the plug of the cock for indicating the period of time during which the fluid will be allowed to pass through the cock before the same is shut off, substantially as set forth.

2. The combination with the gas pipe and cock or valve, of a train of gearing and spring forming a clockwork, gear-wheels connecting the plug of the cock and the arbor of the spring, a key for turning the arbor and winding the spring and simultaneously opening the cock, and a dial and hand moved with the plug of the cock during the opening and closing operations for indicating the period that the fluid will be allowed to pass through the cock, substantially as set forth.

3. The combination with the gas-cock, a spring and train of gearing forming a clockwork, of gearing connecting the plug of the cock to the arbor of the spring, whereby the plug of the cock is turned in one direction in winding the spring and is turned gradually in the other direction as the clock-movement runs down, and a stop for arresting the movement of the plug as the cock is closed, substantially as set forth.

4. The combination with the gas-cock, a spring and train of gearing forming a clockwork, of gearing connecting the plug of the cock to the arbor of the spring whereby the plug of the cock is turned in one direction in winding the spring and is gradually turned in the other direction as the clock-movement runs down, and an adjustable stop for allowing the gas to be entirely shut off or a small flame to remain burning, substantially as set forth.

5. A gas-cock, the plug of which has two peripheral grooves adjacent to and communicating with each other extending around the plug except at the points opposite the supply and discharge pipes where there is sufficient surface on the plug to close them, so that the gasway remains open nearly the entire revolution of the plug and is closed at the end of the movement, substantially as set forth.

6. The combination with the gas-supply pipe and a spring and train of gearing forming a clockwork, of a gas-cock having a plug and gearing connecting the same to the arbor of the spring, such plug having two channels extending almost around the plug, leaving the surfaces of the plug between the ends of the channels for closing the ends of the supply and discharge pipes and connections between the respective channels for allowing the gas to pass from one to the other and for allowing the gasway to remain open during nearly the entire revolution of the plug, substantially as set forth.

Signed by me this 1st day of April, 1897.

J. B. RICHARDS.

Witnesses:
GEO. T. PINCKNEY,
S. T. HAVILAND.